US008665309B2

(12) United States Patent
Ferren (10) Patent No.: US 8,665,309 B2
(45) Date of Patent: Mar. 4, 2014

(54) VIDEO TELECONFERENCE SYSTEMS AND METHODS FOR PROVIDING VIRTUAL ROUND TABLE MEETINGS

(75) Inventor: Bran Ferren, Glendale, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 810 days.

(21) Appl. No.: 12/611,590

(22) Filed: Nov. 3, 2009

(65) Prior Publication Data

US 2011/0102539 A1    May 5, 2011

(51) Int. Cl.
*H04N 7/14* (2006.01)
(52) U.S. Cl.
USPC ..................... 348/14.08; 348/14.16
(58) Field of Classification Search
USPC ............... 348/14.01, 14.07–14.09, 14.16
See application file for complete search history.

(56) References Cited

U.S. PATENT DOCUMENTS

| 5,657,096 | A | 8/1997 | Lukacs |
| 5,691,768 | A | 11/1997 | Civanlar et al. |
| 6,606,111 | B1 * | 8/2003 | Kondo et al. ............. 348/14.01 |
| 7,139,767 | B1 * | 11/2006 | Taylor et al. ................ 707/102 |
| 7,554,571 | B1 * | 6/2009 | Beck et al. ................ 348/14.07 |
| 2004/0196359 | A1 * | 10/2004 | Blackham ................ 348/14.08 |
| 2006/0244817 | A1 * | 11/2006 | Harville et al. ............ 348/14.08 |
| 2008/0077953 | A1 | 3/2008 | Fernandez et al. |
| 2011/0025819 | A1 * | 2/2011 | Gorzynski et al. ......... 348/14.07 |

* cited by examiner

*Primary Examiner* — Quoc D Tran
(74) *Attorney, Agent, or Firm* — Tarolli, Sundheim, Covell & Tummino LLP (57) ABSTRACT

Video teleconferencing systems and methods are provided for providing virtual roundtable meetings. In one embodiment, a video teleconference system is provided for providing virtual round table meetings. The system comprises a curved display surface and a video processor configured to receive a video image of a participant from each of a plurality of remote video teleconferencing systems and display each participant equally spaced about the curved display surface.

20 Claims, 6 Drawing Sheets

VIDEO TELECONFERENCE SYSTEMS AND METHODS FOR PROVIDING VIRTUAL ROUND TABLE MEETINGS

TECHNICAL FIELD

The present invention relates generally to video teleconferencing, and more particularly to video teleconferencing systems and methods for providing virtual roundtable meetings.

BACKGROUND

Video teleconference systems (VTCs) are used to connect meeting participants from one or more remote sites. It has been found through experience that effectiveness of the meeting increases with the illusion that the participants are in the same room. This can be difficult to sustain when switching among several sites, even when the rooms are similarly outfitted, because the act of switching takes control away from participants as to which site to view at any given moment. The current method of switching between participants at different sites impairs the desirable perception that all the participants are in the same room, around a common table. When VTC systems are connected to several remote sites, they may switch between each site on a single display. Alternatively, several VTC systems exist from which one site can view multiple sites and/or multiple participants at once. This can be done with a single display using split screen or windows or alternatively, multiple displays can be used, each showing a site or participant. However, a desirable goal is to foster the illusion that all participants are in one room. Multiple displays or windowed single displays detract from the same-room experience. In addition, these systems do not easily accommodate varying numbers of participants. For example, if many participants or sites are being viewed, the display must switch frequently between participants such that participants are unable to arbitrarily view who they want, as in a real conference room.

SUMMARY

In one aspect of the present invention, a video teleconference system is provided for providing virtual round table meetings. The system comprises a curved display surface and a video processor configured to receive a video image of a participant from each of a plurality of remote video teleconferencing systems and display each participant equally spaced about the curved display surface.

In yet another aspect of the present invention, a plurality of video teleconference systems are provided for providing virtual round table meetings that provide the appearance of occurring within a single room at each of the systems. Each of the systems comprise a curved display surface and a video processor configured to receive a video image of a participant from each of the other of the plurality of remote video teleconferencing systems and to size and display each received video image of a participant equally spaced about the curved display surface within a region on the curved display that is of a similar size. Each of the systems further comprise a semi-circular table that supports the curved display surface, a camera positioned to capture a video image and a microphone positioned to capture audio data of a local participant of a respective system.

In yet another aspect of the present invention, a method is provided for providing virtual round table meetings within a single room. The method comprises receiving video image data of participants from each of a plurality of remote video teleconferencing systems, sizing and spacing of video image data of the participants based on the number of remote participants and displaying the video images of each participant on a display surface to provide the appearance that the meeting is occurring within a single room.

DETAILED DESCRIPTION

Video teleconference systems and methods are provided for providing virtual round table meetings. A given video teleconference system site can consist of a semi-circular table facing a curved display surface at least the width of the table. Imagery can be front-projected or rear-projected onto the curved display surface. A camera is dedicated to each participant, producing a participant view. All sites can be equipped with tables and backdrops that are of similar appearance, although in various sizes befitting the size of each site. This fosters the appearance of a single room. Video from different sites can be blended together, such that the break between rooms is less apparent. To facilitate blending of the background, the fabric or paint pattern on the back wall at each site can be aperiodic to disguise breaks. However, it should not be featureless, as slight lighting differences may then become apparent. Optionally, the outline of each participant can be extracted and a common background substituted for the actual room background.

To accommodate various numbers of participants, the systems can adjust the spacing between participant views to maintain equal spacing. For example, if only three participants are being viewed on the display, they are shown equally spaced. If necessary for spacing, a simulated backdrop or participant view of an empty station is shown between participants. When more participants join the discussion, the participant views are placed closer together. If so many participants join that there is no more room, the participant views are reduced to size to accommodate the number present up to a preset limit. To allow this flexibility, the resolution of the image obtained from each site is remapped to the appropriate pixel space for the desired projected size of each participant.

Figure 1:
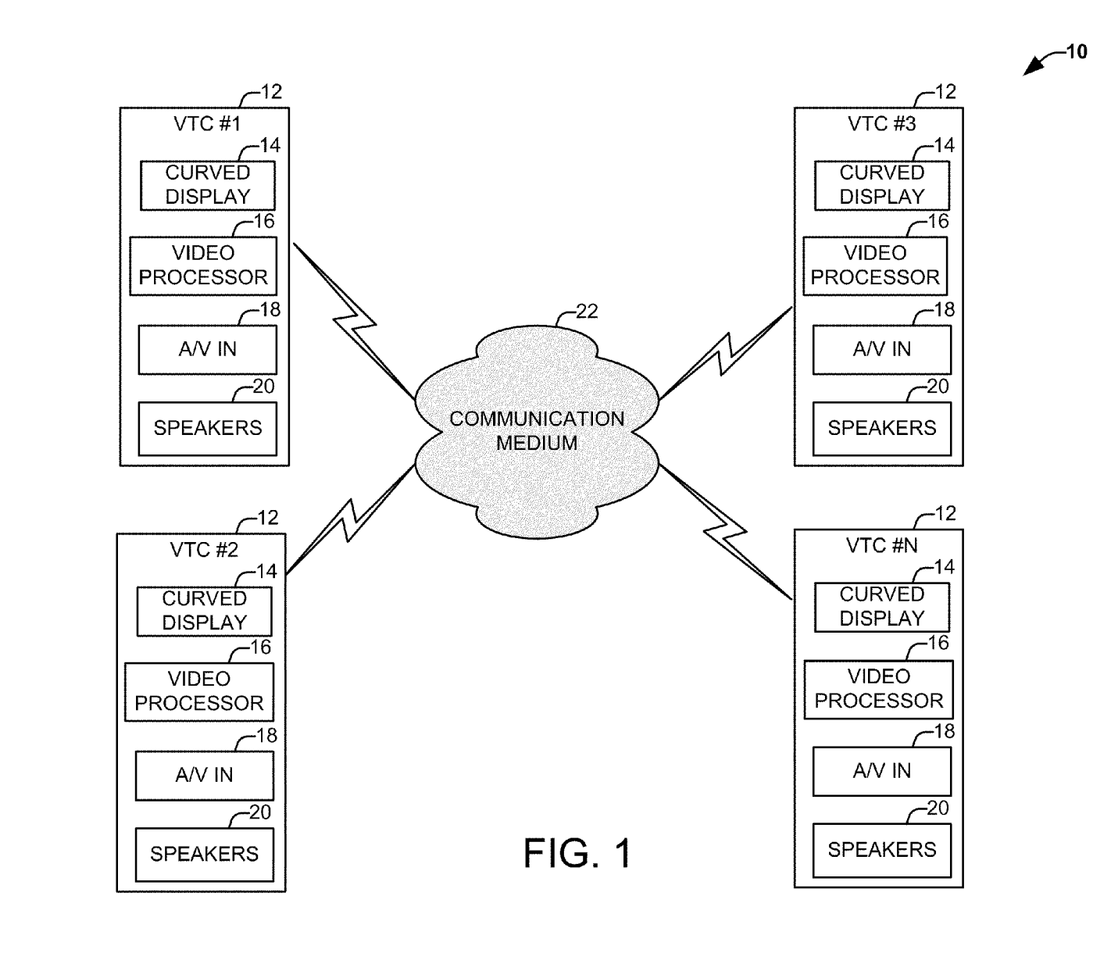
FIG. 1 illustrates a block diagram of a plurality of video teleconferencing systems coupled through a communication medium in accordance with an aspect of the present invention.

FIG. 1 illustrates a plurality of video teleconferencing systems 10 coupled through a communication medium 22 in accordance with an aspect of the present invention. The plurality of video teleconferencing systems 10 are labeled, 1 through N, where N is an integer greater than one. The communication medium 22 can be a local-area or wide-area network (wired or wireless), or a mixture of such mechanisms, which provides one or more communication mechanisms (e.g., paths and protocols) to pass data and/or control between software video teleconferencing systems. Each video teleconferencing system 12 includes a video processor 16 coupled to a curved display surface 14, audio and video (A/V) inputs 18 (e.g., microphone, camera) and speakers 20 for playing audio sounds from other VTCs. The video processor 16 can be an analog video processor and components, a computer video processor or a computer network video processor as one or more integrated circuits or circuit boards containing one or more microprocessors. The curved display surface 14 can be either a front or a back projected surface. The video processor 16 is configured to receive video images of participants from each of the other video teleconferencing systems 12 and display each participant equally sized and spaced about the curved display surface 14 to provide the appearance of a virtual round table meeting. Each video teleconferencing system 12 can be placed on a semicircular table that supports the curved display surface 14 to further facilitate the appearance of a virtual round table meeting.

In one aspect of the invention, if a number of displayed participants exceeds a predetermined limit, the video processor 16 resizes the regions of the displayed participants to fit within a field of view of the curved display surface 14. In another aspect of the invention, if a number of displayed participants is less than a predetermined limit, the video processor 16 displays a simulated backdrop or empty station in at least one region of the curved display surface 14. In yet a further aspect of the invention, a common backdrop is positioned behind each participant, such that each video image of the participant has a common background. This background may be comprised of a material having a surface pattern or texture that disguises seams between adjacent projections, such as a neutral color or aperiodic pattern. The video processor 16 is then configured to blend each of the common backgrounds together to provide the impression of a background of a single room. Alternatively, the video processor 16 can be configured to replace each of the backgrounds with a common overall background to provide the impression of a background of a single room. In this situation, the background behind each participant is irrelevant since it is to be replaced by a common overall background.

Figure 2:
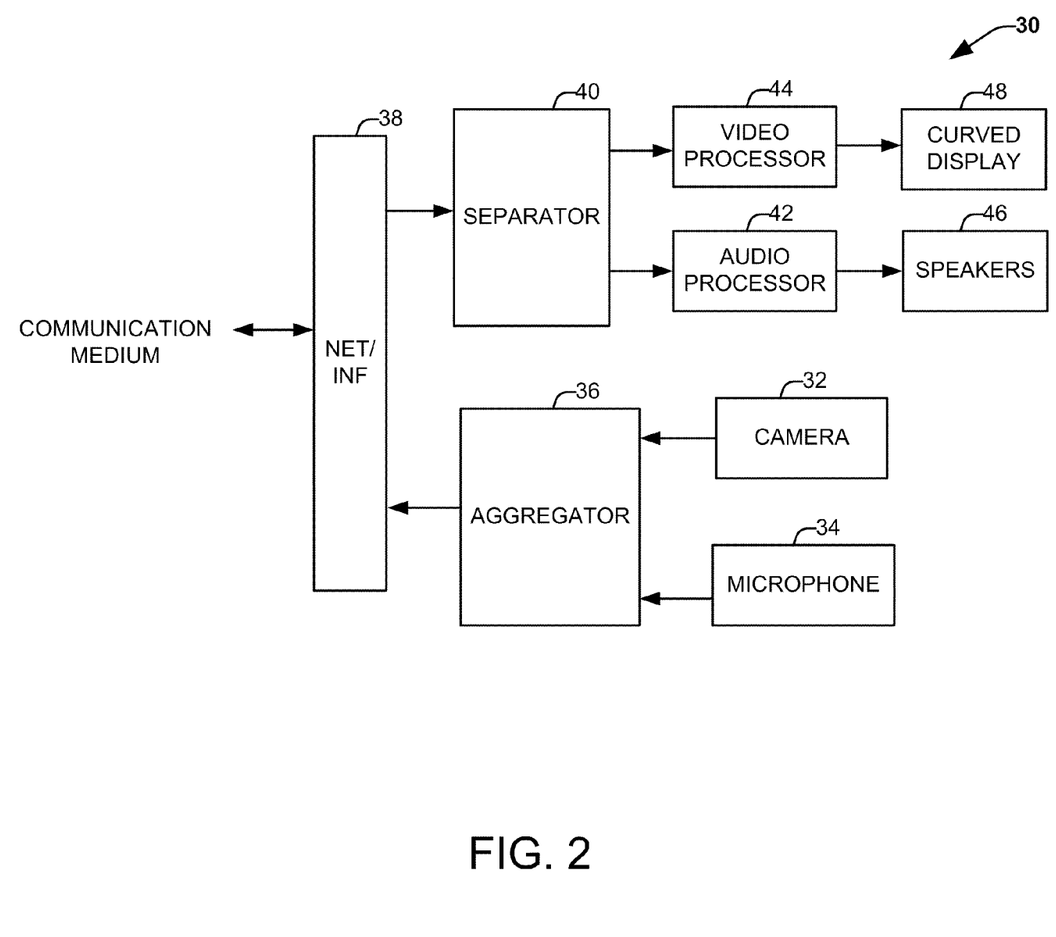
FIG. 2 illustrates a block diagram of exemplary components of a video teleconferencing system in accordance with an aspect of the present invention.

FIG. 2 illustrates a block diagram of exemplary components of a video teleconferencing system 30 in accordance with an aspect of the present invention. The video teleconferencing system 30 includes a microphone 34 that receives sound from a participant and a camera 32 that receives video image data of a participant. The audio data and video image data of the participant are provided to an aggregator 36 that aggregates and serializes the audio and video image data of the participant and provides it to a network interface 38. The network interface 38 provides the aggregated serialized data through a communication medium to other video teleconferencing systems coupled to the communication medium. The network interface 38 also receives aggregated serialized audio data and video image data of other participants from respective remote video teleconferencing systems and provides this data to a separator 40. The separator 40 separates the audio inputs and video image data of the participants and provides the audio data to an audio processor 42 and the video image data of the participants to a video processor 44. The audio processor 42 and video processor 44 may be synchronized to synchronize different channels of audio and video data from different video teleconferencing systems.

The video processor 44 is configured to process video image data of participants from a plurality of video teleconferencing systems. The video processor 44 is configured to receive video images of participants from each of the other video teleconferencing systems and display each participant equally sized and spaced about a curved display surface 48 to provide the appearance of a virtual round table meeting. Sizing can be accomplished by automatic head-size equalization techniques for equalizing participant's head sizes at a same table where participants are at varying distances from a camera, such as that described in "Head-size equalization for improved visual perception in video conferencing", Liu et al. (see http://research.microsoft.com/enus/um/people/cohen/tmm.pdf). Edge detection can be used by the video processor 44 to extract the participant outlines from the backdrops; alternatively, analog methods such as chroma-key or luma-key can be used. With both methods, sufficient contrast between participants and the physical backdrops must be present.

If a common backdrop is positioned behind each participant, such that each video image of the participant has a common background that may be blended with similar backgrounds, the video processor 44 can be configured to blend the common backgrounds together and display the blended backgrounds on the curved display surface 48 to provide the appearance of a background of a single room. The common backdrops should be of a fine grained enough texture or pattern that it appears the same over the likely range of magnification. Examples may be an aperiodic pattern and/or neutral color. If the desired spacing means a participant image falls between two cameras, the images can be optically blended together, or computationally blended by adjusting pixel-by-pixel brightness for even illumination across the curved display and correcting for geometry. There are a number of software packages that can be employed to blend images on a display surface, such as EasyBlend™ from Scalable Display Technologies.

Alternatively, the video processor 44 can be configured to replace and display each of the backgrounds with a common overall background to provide the impression of a background of a single room. Filming participants against a common or substituted backdrop can be accomplished employing background replacement techniques such as bluescreen or depth analysis. For example, video background replacement techniques can be employed such as that described in U.S. Patent Publication 2008/0077953A1, entitled "Video Background Replacement System". The audio processor 42 can provide audio data to speakers 46 as the video processor 44 displays the participant images on the curved display surface 48.

Figure 3:
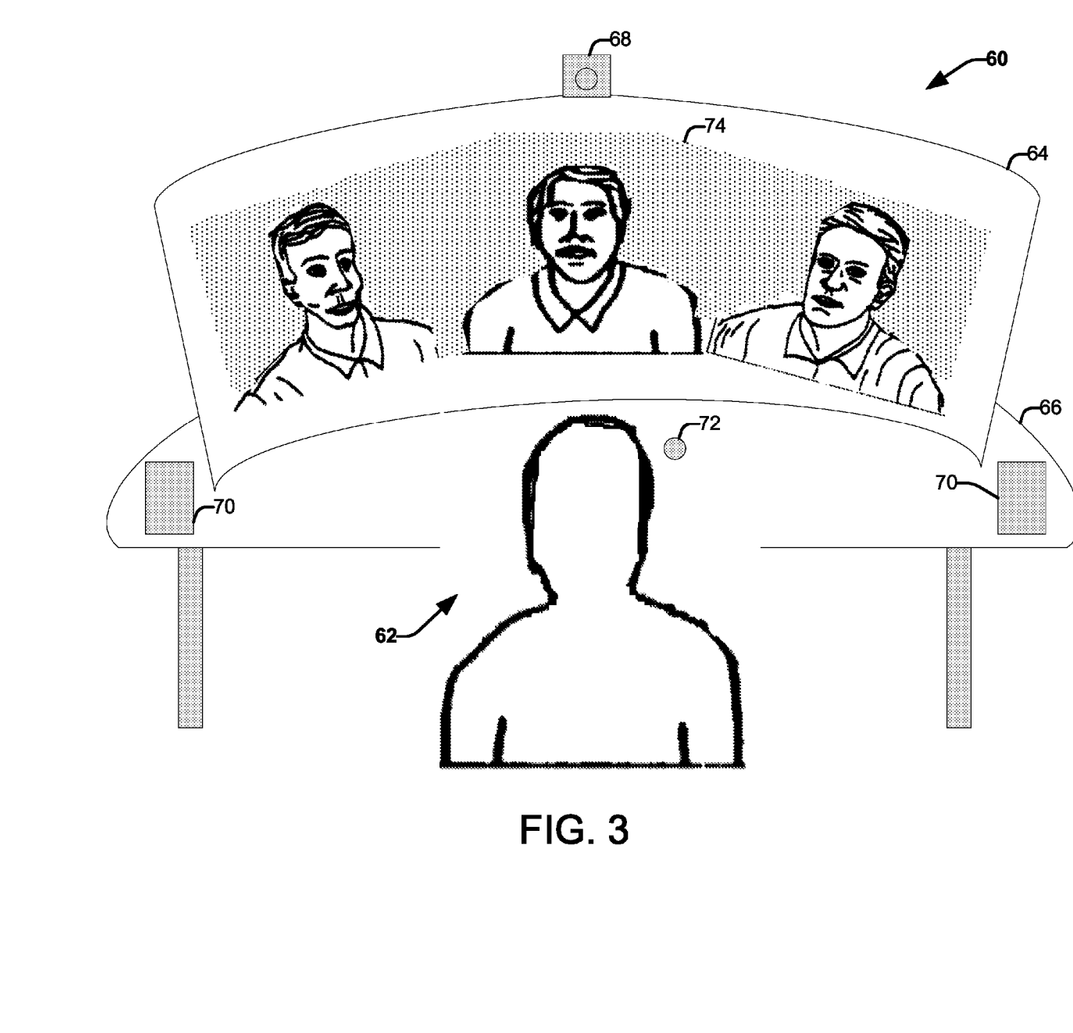
FIG. 3 illustrates a participant view of a video teleconferencing system with three displayed participants in accordance with an aspect of the present invention.

FIG. 3 illustrates a participant view of a video teleconferencing system 60 with three displayed participants in accordance with an aspect of the present invention. A participant 62 is positioned in front of a curved display surface 64 residing on a semi-circular table 66. A camera 68 is positioned in front of the participant 62 above the curved display surface with a microphone 72 and speakers 70 positioned adjacent to the curved display surface 64. Three displayed participants from remote video teleconferencing systems are displayed equally spaced about the curved display surface 64 and equally sized. A common background 74 is displayed behind the three displayed participants, which is a blended background in the example of employing common backgrounds at each remote location or a replaced background in the example of replacing backgrounds at each remote location with a common background. In the example of FIG. 3, the number of participants does not exceed a predetermined limit of participants that can be equally spaced and sized within the curved display surface 64.

Figure 4:
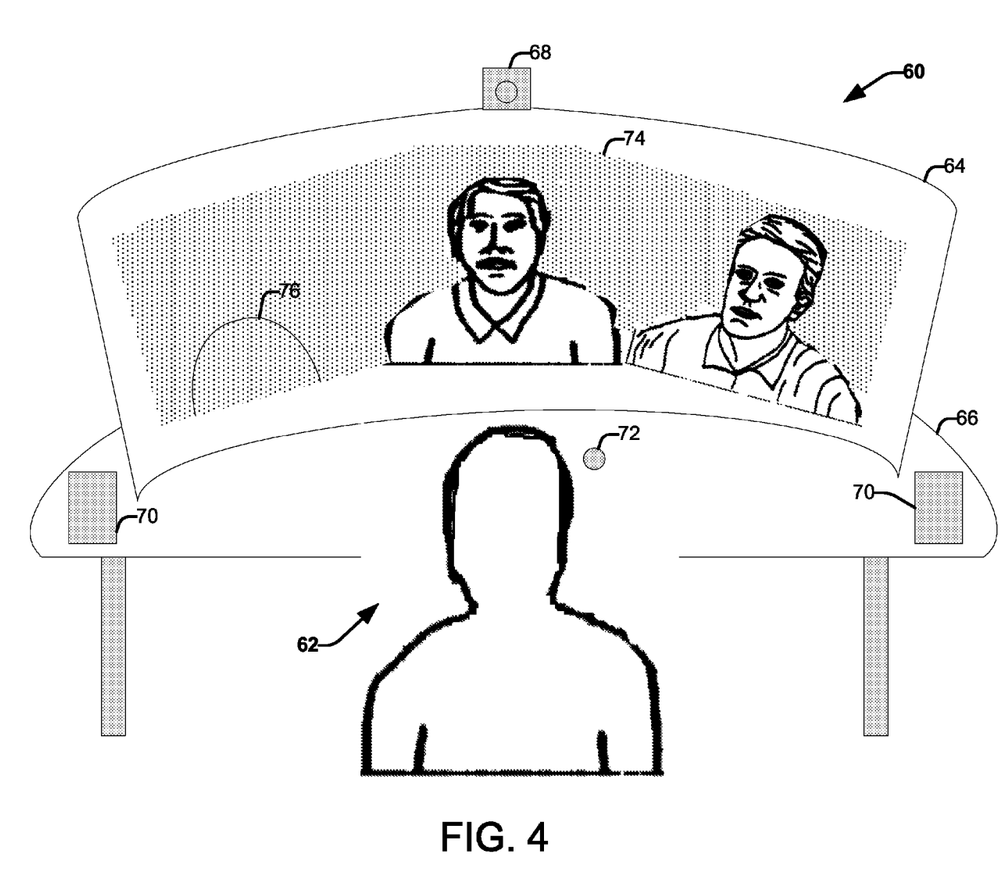
FIG. 4 illustrates a participant view of a video teleconferencing system with two displayed participants and an empty space in accordance with an aspect of the present invention.

FIG. 4 illustrates a participant view of the video teleconferencing system 60 of FIG. 3 with two displayed participants and an empty station in accordance with an aspect of the present invention. In the example of FIG. 4, the number of displayed participants is less than a predetermined limit and the video processor displays a simulated backdrop or empty station in at least one region of the curved display surface. In the present example, an empty chair 76 is illustrated as representing an empty station.

Figure 5:
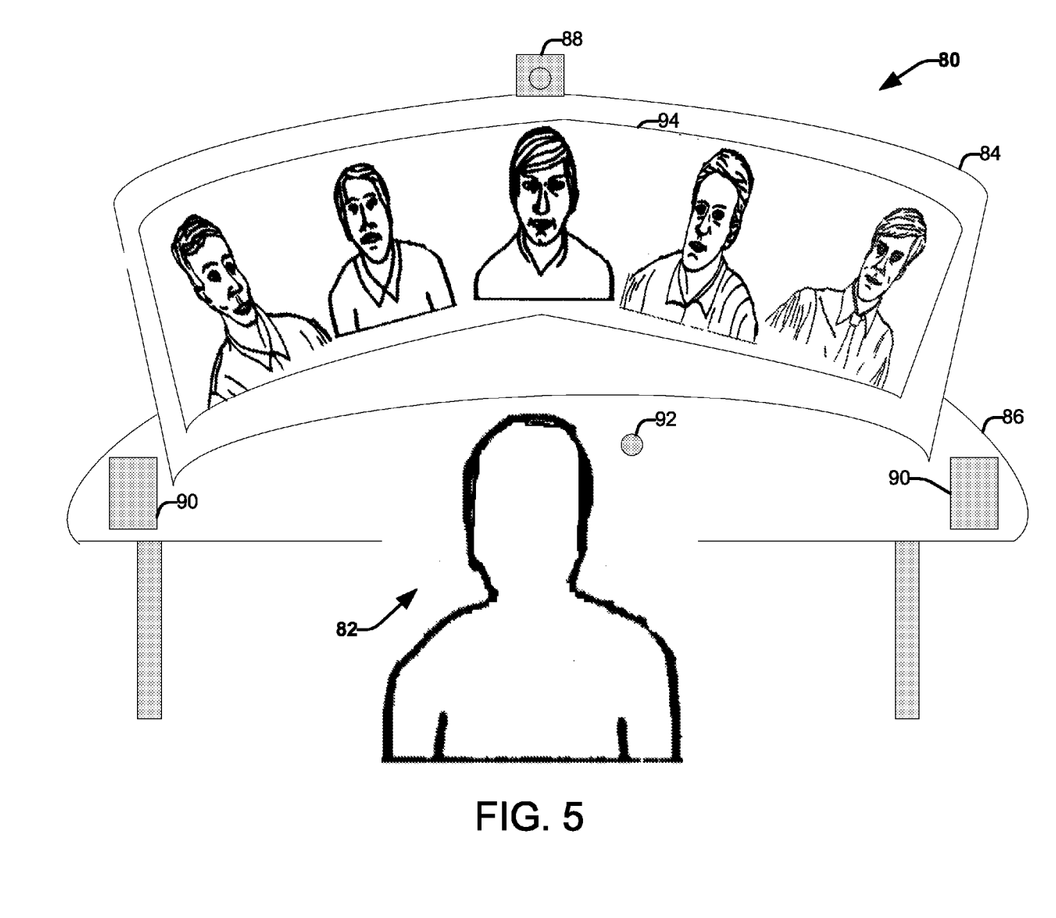
FIG. 5 illustrates a participant view of a video teleconferencing system with five displayed participants in accordance with an aspect of the present invention.

FIG. 5 illustrates a participant view of a video teleconferencing system 80 with five displayed participants in accordance with an aspect of the present invention. A participant 82 is positioned in front of a curved display surface 84 residing on a semi-circular table 86. A camera 88 is positioned in front of the participant 82 above the curved display surface 84 with a microphone 92 and speakers 90 positioned adjacent to the curved display surface 84. Five displayed participants from remote video teleconferencing systems are displayed equally spaced and equally sized about the curved display surface. A common background 94 is displayed behind the five displayed participants, which is a blended background in the example of employing common backgrounds at each remote location or a replaced background in the example of replacing backgrounds at each remote location with a common background. In the example of FIG. 5, the number of participants does exceed a predetermined limit of participants that can be equally spaced and sized within the curved display surface 84. The participant images are resized to fit within the field of view of the curved display 84.

Figure 6:
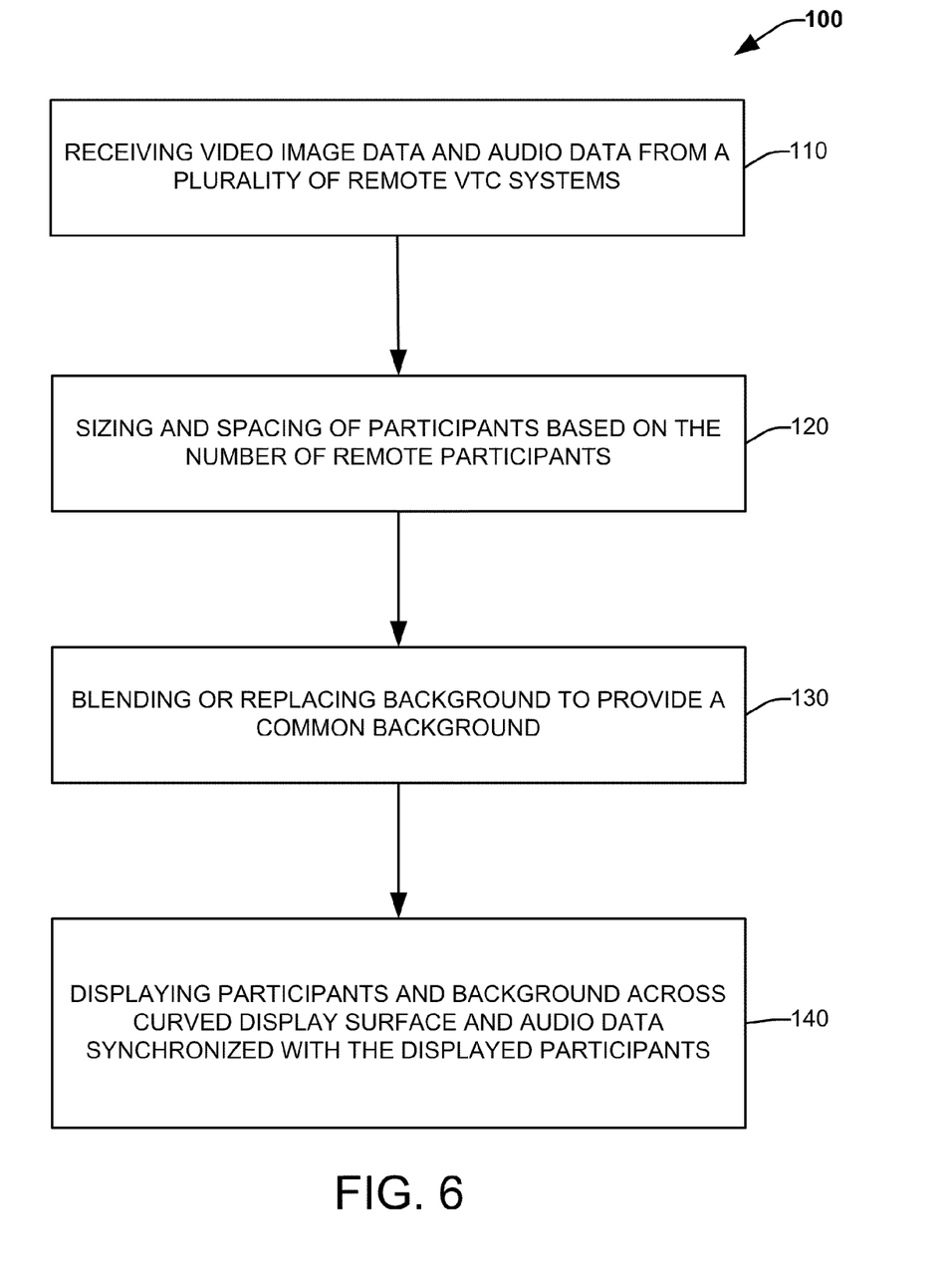
FIG. 6 illustrates a video teleconferencing methodology for providing virtual roundtable meetings in accordance with an aspect of the present invention.

In view of the foregoing structural and functional features described above, a method will be better appreciated with reference to FIG. 6. It is to be understood and appreciated that the illustrated actions, in other embodiments, may occur in different orders and/or concurrently with other actions. Moreover, not all illustrated features may be required to implement a method. It is to be further understood that the following method can be implemented in hardware (e.g., an analog video processor and components, a computer video processor or a computer network video processor as one or more integrated circuits or circuit boards containing one or more microprocessors), software (e.g., as executable instructions running on one or more processors of a computer system), or any combination thereof.

FIG. 6 illustrates a video teleconferencing methodology 100 for providing virtual roundtable meetings in accordance with an aspect of the present invention. The method begins at 110 where video image data and audio data are received from a plurality of remote VTC systems. At 120, the video image data of the participants are sized and spaced based on the number of remote participants. At 130, the backgrounds of the video image data are blended or replaced with a common background. At 140, the participants and common background are displayed across the curved display surface equally sized and spaced with a common background to provide the appearance of a meeting in a single room and the audio data is synchronized with the displaying of the participants.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

Having the described the invention, the following is claimed:

1. A video teleconference system for providing virtual round table meetings, the system comprising:
   a curved display surface; and
   a computing system configured to receive a video image of an individual participant from each of a plurality of remote video teleconferencing systems and display each respective individual participant equally spaced about the curved display surface at a substantially similar size that is variable based on a quantity of participants of the respective plurality of remote video teleconferencing systems.

2. The system of claim 1, wherein if a number of displayed participants exceeds a predetermined limit, the computing system resizes the regions of the displayed participants to fit within a field of view of the curved display surface.

3. The system of claim 1, wherein if a number of displayed participants is less than a predetermined limit, the computing system displays a simulated backdrop or empty station in at least one region of the curved display surface.

4. The system of claim 1, wherein each video image of the participant has a common background, the computing system blending each of the common backgrounds together behind the displayed participants to provide the impression of a background of a single room.

5. The system of claim 4, wherein each of the common backgrounds have an aperiodic fabric or pattern.

6. The system of claim 1, wherein each video image of the participant has a background, the computing system replacing each of the backgrounds with a common overall background behind the displayed participants to provide the impression of a background of a single room.

7. The system of claim 1, wherein the curved display surface is one of front projected surface and back projected surface 8. The system of claim 1, further comprising a semicircular table that supports the curved display surface and a camera and a microphone positioned to capture a video image and audio data of a local participant of the system.

9. The system of claim 1, further comprising a plurality of curved display surfaces and computing systems located at remote locations and each configured to receive a video image of a participant from each of a plurality of remote video teleconferencing systems and display each participant equally spaced about the curved display surface.

10. A plurality of video teleconference systems for providing virtual round table meetings that provide the appearance of occurring within a single room at each of the systems, each of the systems comprising:
   a curved display surface;
   a computing system configured to receive a video image of an individual participant from each of the other of the plurality of remote video teleconferencing systems and to size and display each received video image of the respective individual participant equally spaced about the curved display surface within a region on the curved display such that each of the individual participants is displayed at a substantially similar size in a manner that is variable based on a number of the other of the plurality of remote video teleconferencing systems;
   a semicircular table that supports the curved display surface;
   a camera positioned to capture a video image of a local participant of a respective system; and a microphone positioned to capture audio data of the local participant of the respective system.

11. The systems of claim 10, wherein if a number of displayed participants exceeds a predetermined limit, the computing system resizes the regions of the displayed participants to fit within a field of view of the curved display.

12. The systems of claim 10, wherein if a number of displayed participants is less than a predetermined limit, the computing system displays a simulated backdrop or empty station in at least one region.

13. The systems of claim 10, wherein each video image of the participant has a common background, the computing system blending each of the common backgrounds together behind the displayed participants to provide the impression of a background of a single room.

14. The systems of claim 13, wherein each of the common backgrounds have an aperiodic fabric or pattern.

15. The systems of claim 10, wherein each video image of the participant has a background, the computing system replacing each of the backgrounds with a common overall background behind the displayed participants to provide the impression of a background of a single room.

16. A method for providing virtual round table meetings within a single room, the method comprising:
   receiving video image data of individual participants from each of a plurality of remote video teleconferencing systems;
   sizing and spacing of video image data of the individual participants based on the number of remote participants such that each individual participant is displayed at a substantially similar size and spaced apart substantially equally; and
   displaying the video images of each individual participant on a display surface to provide the appearance that the meeting is occurring within a single room.

17. The method of claim 16, wherein each of the displayed participants are displayed within a region on a curved display surface that is of a similar size and equally spaced about the curved display surface, wherein if a number of displayed participants exceeds a predetermined limit, the regions of the displayed participants are resized to fit within a field of view of the curved display surface and if a number of displayed participants is less than a predetermined limit, a simulated backdrop or empty station is displayed in at least one region of the curved display surface.

18. The method of claim 16, wherein each video image of the participant has a common background and further comprising blending each of the common backgrounds together behind the displayed participants to provide the impression of a background of a single room.

19. The method of claim 16, wherein each video image of the participant has a background, and further comprising replacing each of the backgrounds with a common overall background behind the displayed participants to provide the impression of a background of a single room.

20. The system of claim 1, wherein the resolution of the video image obtained from each site is remapped to an appropriate pixel space for the desired projected size of each participant.

* * * * *